United States Patent [19]

Masuda et al.

[11] 3,865,973

[45] Feb. 11, 1975

[54] STILL PICTURE BROADCASTING RECEIVER

[75] Inventors: Michio Masuda, Tokyo; Katsuo Mohri; Hiroaki Nabeyama, both of Yokohama; Teruhiro Takezawa, Tokyo; Hisakichi Yamane, Tokyo; Eiichi Sawabe, Tokyo; Akio Yanagimachi, Kawasaki; Takashi Uehara, Tokyo; Takehiko Yoshino, Yokohama, all of Japan

[73] Assignees: Hitachi Limited; Nippon Hoso Kyokai, both of Tokyo, Japan

[22] Filed: May 18, 1973

[21] Appl. No.: 361,802

[30] Foreign Application Priority Data

| | | |
|---|---|---|
| May 23, 1972 | Japan | 47-050389 |
| Dec. 27, 1972 | Japan | 47-129796 |
| Feb. 9, 1973 | Japan | 48-016293 |

[52] U.S. Cl.....178/5.8 R, 178/69.5 TV, 168/DIG. 23, 179/15 A, 179/15 AC, 179/15 BS

[51] Int. Cl. .......................... H04n 5/04, H04n 5/08

[58] Field of Search .......... 178/5.8 R, 5.6, 69.5 TV, 178/DIG. 23; 179/15 BY, 15 BS, 15 BM, 15 A, 15 AC

[56] References Cited

UNITED STATES PATENTS

| | | | |
|---|---|---|---|
| 2,750,498 | 6/1956 | Arbuckle | 178/69.5 TV |
| 3,144,515 | 8/1964 | Kaneko | 179/15 BS |

*Primary Examiner*—Robert L. Griffin
*Assistant Examiner*—Mitchell Saffian
*Attorney, Agent, or Firm*—Stevens, Davis, Miller & Mosher

[57] ABSTRACT

A receiver for a composite signal consisting of video and audio multiplex signals intermittently transmitted in a predetermined sequence and having synchronizing signals with a blanking period and different repetition frequencies in the video signal period and the audio multiplex signal period, wherein the synchronizing signals are so composed as to have an identical mode at least for a part thereof at a common measure frequency of the two different repetition frequencies. The receiver comprises a gate circuit, a coincidence circuit for producing a coincidence signal when a signal having a mode identical with the mode of the synchronizing signal at the common measure frequency is supplied, a coincidence confirming circuit having a certain level exceeding a predetermined level when said coincidence signal is supplied regularly, a means for producing first and second signals having a phase controlled by said coincidence signal and having said two repetition frequencies respectively and a third signal having frequency of the common measure or common multiple frequency of said two repetition frequencies, and a means for operating a gate circuit by said third signal only when a coincidence confirming signal is supplied and for controlling said gate circuit to pass the composite signal during a period. The receiver further comprises means for detecting a blanking period by said third signal and a means for controlling gain of the receiver in accordance with the detected level. The receiver still further comprises means for fixing the level of the blanking period by using a part of the blanking period a predetermined fixed level.

17 Claims, 16 Drawing Figures

STILL PICTURE BROADCASTING RECEIVER

BACKGROUND OF THE INVENTION

The present invention relates to a receiver for a composite signal consisting of video and an audio multiplex signals intermittently transmitted in a predetermined sequence and comprising respective synchronizing signals of different repetition periods inserted in the video and audio multiplex periods but having at least a partly identical mode at a common measure frequency of the two different repetition periods.

More specifically, the present invention relates to a receiver for said composite signal comprising a synchronizing signal regenerator for generating two synchronizing signals having different repetition frequencies being synchronized with repetition frequencies of said two synchronizing signals.

The present invention further relates to a receiver for said composite signal comprising an automatic gain controlling circuit for controlling the amplifying gain of an amplifier for the composite signal by producing a reproduced single period synchronizing signal by the reproduced two signals through said synchronizing signal regenerator and by gating said composite signal with the single period synchronizing signal and detecting the level of the pause or blanking period provided in succession to the synchronizing signal and by producing an automatic gain controlling voltage.

The present invention still further relates to a receiver for said composite signal comprising a clamp circuit for correctly identifying the audio multiplex signal by producing said single period reproduced synchronizing signal from the two signals reproduced by said synchronizing signal regenerator and by fixing the level of the blanking period at a predetermined voltage level at least at a portion of the blanking period by using the single period reproduced signal.

A suitable embodiment of the composite signal is a still picture broadcasting signal. The receiver of the present invention is particularly suitable for use in a still picture broadcasting signal receiver.

In a still picture signal transmission system, the video and audio signals are transmitted alternately in a predetermined sequence. In one type of a still picture broadcasting signal, a 1/30 second period video signal and a 1/15 second period audio signal are alternately transmitted. The video signal is transmitted at each horizontal scanning period of $1/f_H$ (=63.5 $\mu$s) which is the same as a standard television signal and the audio signal is transmitted in a pulse code modulated time division multiplex signal and at a different period $1/f_A$ different from that of the video signal. Accordingly, the required synchronizing signals for reproducing the video and audio signals are transmitted in different periods namely in the $1/f_H$ period during the transmission of the video signal and the $1/f_A$ period during the transmission of the audio signal. The synchronizing signal comprises a blanking period, a PCM frame pattern signal (PFP signal) comprising a 16 bit signal which is synchronized with the audio multiplex signal and a mode controlling signal (MCC signal) comprising a horizontal synchronizing signal, an audio frame synchronizing signal, a frame signal, etc.

In such a still picture broadcasting signal, the ratio between the synchronizing signal period $1/f_H$ transmitted during the video signal transmission period and that of $1/f_A$ transmitted during the audio transmission period is so selected as to be in an integer ratio. Also the period $t_b$ of the PFP signal is selected to be in an integer ratio with the period $1/f_H$ and $1/f_A$.

In order to receive the abovementioned still picture broadcasting signal and to display a selected picture on an image display device and to reproduce the a corresponding sound of a picture, it is required to reproduce the synchronizing signal formed by the PFP signal and the MCC signal.

The synchronizing signal formed by the PFP signal and the MCC signal is inserted into the video signal and the audio signal with substantially the same peak level as that of these signals. Therefore, a conventional synchronizing signal separating circuit such as a slice circuit based on the amplitude separation principle is not applicable for the separation of the synchronizing signal. For the reproduction of the synchronizing signal a particular detection circuit is required.

Furthermore, in the receiver of said kind for a still picture broadcasting signal, an automatic gain controlling (AGC) circuit is required for compensating for electric field variation of the received electric wave in the same manner as an ordinary television receiver. In an ordinary color television receiver, peak value of the horizontal synchronizing signal having its repetition frequency of 15.734 KHz and inserted in the signal regularly is detected by gating out by using the reproduced flyback pulse and is fed back to the tuner and to IF stages as an AGC voltage to provide an automatic gain control in a known manner. This known automatic gain control system is referred to as a keyed AGC system.

In the abovementioned still picture signal transmission system, a pause or a blanking period is provided in the synchronizing signal for correctly indicating the signal level so that this level may be used as a standard of the gain control. However, as mentioned above, the repetition period of the pause is not constant as is the case of an ordinary television signal. Said pause is transmitted at each $1/f_H$ period during the video signal transmission period and is transmitted at each $1/f_A$ period during the audio signal transmission period.

Obviously it is possible to introduce an identical idea to detect the level of the pause or blanking period as in the case of the keyed AGC of an ordinary television receiver. This may be accomplished by reproducing two synchronizing signals having different repetition periods and making a code discrimination in the MCC signal for indicating either the video or audio transmission period and by gating out all the pauses included in the transmission signal and detecting the transmitted AGC voltage.

Although the abovementioned detection circuit is not impossible to realize, the synchronizing signal reproduction circuit becomes too complicated and therefore is not practical. Also, since the repetition period of the AGC detection voltage is different in the video transmission period and in the audio transmission period the detected voltage contains ripples. This may cause an error in the identification of the audio signal and may cause a distortion in the video signal.

The audio and synchronizing signals are pulse code modulated signals so that for the reproduction of such PCM signal, it is required normally to provide a clamp circuit at a preceding stage of an identification circuit in order to assure the identification operation. This clamping circuit is used to a fix particular level of a signal to be coincident with a reference level. In the foregoing still picture signal, the pause period may be used for this adjusting purpose. In other words, in such system the pause is transmitted at a certain level irrespective of the content of the signal so that the period of the pause may conveniently be used for the clamping purpose.

As explained previously, the pause has a different repetition period such as $f_H$ and $f_A$ in the video frame and in the audio frame so that the clamping should be carried out at the different respective periods, but this may cause occurrence of audio frame frequency ripple and hence a perfect clamping can not be realized.

SUMMARY OF THE INVENTION

A first object of the present invention is to realize a novel and effective receiver suitable for use in the reception of a still picture broadcasting signal.

A second object of the invention is to realize this kind of novel receiver comprising a synchronizing signal regenerator of a very simple construction.

A third object of the present invention is to realize such kind of receiver comprising a synchronizing signal regenerator suitable for reproducing the synchronizing signal inserted in such still picture broadcasting signal.

A fourth object of the present invention is to obtain such kind of receiver comprising a synchronizing signal regenerator which may regenerate a synchronizing signal transmitted at different repetition frequencies in the video signal transmission period and in the audio signal transmission period.

A fifth object of the present invention is to obtain said kind of receiver having a simple construction and comprising an automatic gain control circuit able to suppress the deviation of amplitude of the still picture broadcasting signal.

A sixth object of the present invention is to realize said kind of receiver comprising an automatic gain control circuit for producing an automatic gain control voltage by utilizing the synchronizing signals being transmitted in a different repetition frequency in the video signal transmission period and in the audio signal transmission period.

A seventh object of the present invention is to realize a receiver of a simple construction having a clamp circuit able to fix a level of a predetermined period of the still picture broadcasting signal at a reference level.

An eighth object of the present invention is to realize a receiver having a clamp circuit which utilizes the synchronizing signals being transmitted in a different repetition period in the video signal transmission period and in the audio signal transmission period.

In one aspect of the present invention, in which a composite signal includes a video signal and an audio signal alternately transmitted in a predetermined sequence and each having a pulse coded synchronizing signal inserted in the respective transmission periods, the pulse coded synchronizing signals having different repetition frequencies for the video and audio signal periods and in which the synchronizing signals both have a blanking period and at least parts of the coded pulses have an identical mode, namely identically coded parts of the synchronizing signals inserted in the video and audio signal periods, at a common measure frequency of said two repetition frequencies of the synchronizing signals, the invention lies in a receiver comprising a synchronizing signal regenerator having a coincidence circuit for producing a coincidence signal having a frequency of the common measure frequency of the two repetition frequencies when a coded synchronizing signal having identical mode with said part of the coded pulses is supplied, and a means for producing first and second signals having said two repetition frequencies, respectively when the signal phase is controlled by said coincidence signal.

As a further aspect of the present invention, the receiver is equipped with an automatic gain control device comprising a means for producing a third signal having a common means frequency of said two repetition frequencies from said first and second signals, a gate circuit, a means for detecting the signal level of the blanking period by controlling the gate circuit by said third signal, and a means for controlling gain of the receiver by using the detected signal.

In a still further aspect of the present invention, the receiver of the present is provided with a clamp circuit for fixing the level of the blanking period of the composite signal at a predetermined voltage by using said third signal.

DESCRIPTION OF THE PREFERRED EMBODIMENT

As a most suitable composite signal to be received in the receiver of the present invention, a still picture broadcasting system will be explained by referring to FIGS. 1 and 2.

Figure 1:
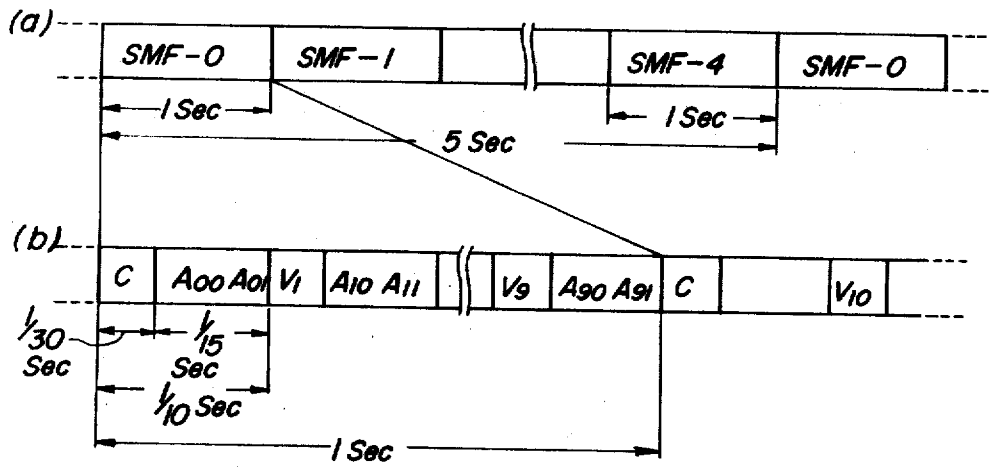
FIGS. 1 and 2 are charts for indicating signal composition of an embodiment of a still picture broadcasting signal.

As shown in FIG. 1, the still picture broadcasting signal is transmitted with a 5 second repetition period. In the 5 second repetition period, 5 sub-master frames SMF-0, SMF-1, . . . SFM-4 each having a 1 second period are inserted sequentially. Therefore, an identical sub-master frame SMF is transmitted at each 5 seconds. One sub-master frame SMF consists of 30 television frames having a television frame frequency of 30 Hz. One of the 30 frames is used as a control frame C for accommodating various control signals. In the still picture transmission system a pair of video and audio signals are used for representing one particular program. The pair of signals are separately transmitted in time division multiplex from a transmitting end. In the receiving end the control signals are required in order to reproduce correctly a corresponding pair of signals of a program. There are other controlling signals, accommodated in the control frame C, which are used for selecting a desired program consisting of a pair of signals among a plurality of programs. 9 frames out of the 30 frames are used as video frames V and the other 20 frames are used as audio frames A. In a series of such 30 sub-master frames SMF, the control frame C is situated at the beginning of the series.

Figure 2:
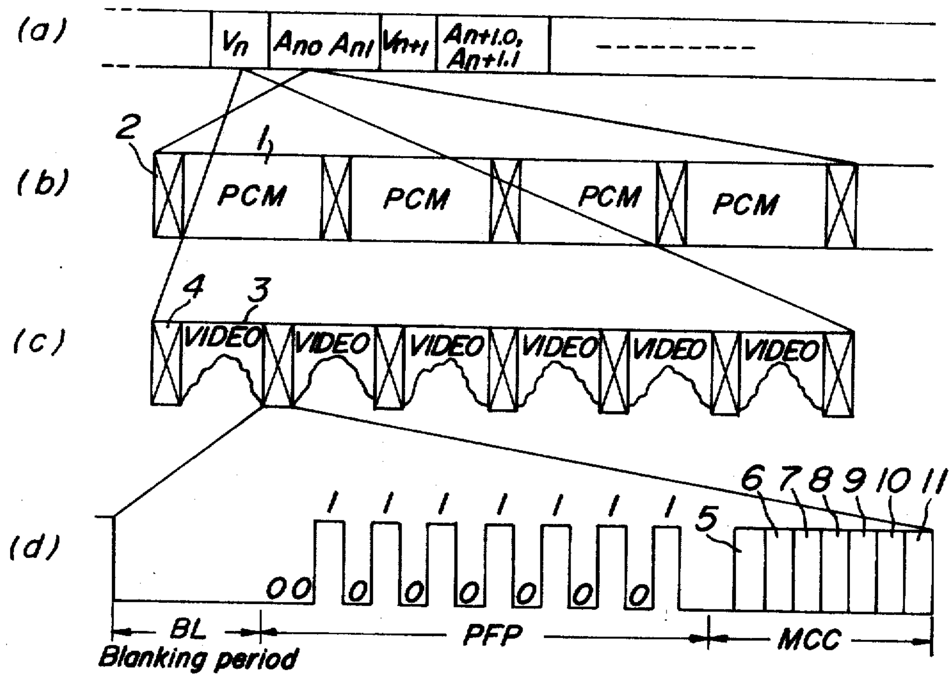

FIG. 2 is a diagram showing the signal waveform of the signals inserted in the video frame V and the audio frame A. In the audio frame A, as shown in FIG. 2*b*, a pulse code modulated audio multiplex signal 1 and synchronizing signal 2 are inserted. The sampling period of the pulse code modulated audio multiplex signal 1, which is the same as the insertion period of the synchronizing signal 2, is $1/f_A$ wherein $f_A$ is nearly equal to 10.5 KHz. Hereinafter, the above period is referred to as an audio frame period. In the video frame V, as shown in FIG. 2*c*, an NTSC video signal 3 and synchronizing signal 4 are inserted. The synchronizing signal 4 is inserted at each horizontal period $1/f_H$ ($f_H$=15.734 KHz). Accordingly, there exists the following relation.

$$f_A/f_H=2/3$$

Therefore, the insertion positions of both signals 2 and 4 or the phases of both signals 2 and 4 coincide at the greatest common measure frequency of both frequencies $f_H$ and $f_A$ of approximately 5 KHz. As shown in FIG. 2*d*, the synchronizing signal 2 or 4 is built from a blanking period BL, PCM frame pattern signal PFP (hereinafter referred as PFP signal), and mode control signal MCC (hereinafter referred as MCC signal). The PFP signal is a pulse series synchronized with the modulated pulse series of the audio multiplex signal. The pulse series has a fixed pulse pattern of 0101 of 16 bits. By using said fixed pulse pattern, the bit signal having a repetition frequency $f_b$=6.5454 MHz for obtaining timing of the pulse code modulated signal (PCM signal) is reproduced. The MCC signal is formed by an 8 bit signal and in the 8 bit signal 7 kinds of synchronizing signals, i.e., horizontal synchronizing signal 5 having the repetition frequency of 15.734 KHz, audio frame synchronizing signal 6 having the repetition frequency of 10.5 KHz, frame synchronizing signal 7, synchronizing signal 8 showing the position of the control frame, synchronizing signals 9 and 10 for showing positions of 1st and 2nd audio frames, and synchronizing signal 11 for showing the position of the video signal are inserted. In these synchronizing signals 5 to 11, if the pulse has a value of 1, then the synchronizing signal is inserted and if the pulse has a value of 0 then the synchronizing signal is not inserted.

Figure 3:
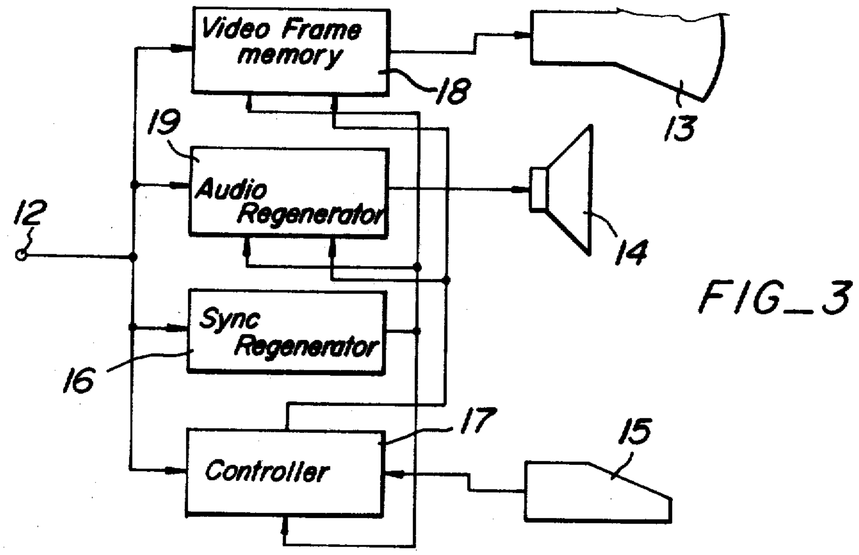
FIGS. 3 and 4 are block-diagrams for explaining the outline of a still picture broadcasting signal receiver according to the present invention.

The still picture broadcasting signal as indicated in FIGS. 1 and 2 is received by a receiver as shown in FIG. 3.

FIG. 3 shows a simplified block diagram of a receiver for the still picture broadcasting signal. In the drawing, 12 shows an input terminal to which the abovementioned still picture signal is supplied. 13 shows a Brown tube for reproducing the still picture. 14 is a speaker for reproducing the audio signal. 15 is an instruction keyboard for designating a particular pair of video and audio signals according to the selection of the receiving party. The still picture broadcasting signal supplied to the input terminal 12 is at first treated in the synchronizing signal regenerator 16 to take out only the synchronizing signal and to reproduce the synchronizing signal required for the reproduction of the still picture and the information is distributed into various portions of the receiver. The instruction keyboard 15 generates an instruction signal for deriving a desired pair of video and audio signals and supplies the instruction signal to a controller 17. The controller 17 produces trigger pulses for taking out the designated video and audio signals designated by the instruction signal when the signals are transmitted, and supplies the trigger pulses to a video frame memory 18 and an audio regenerator 19. The video frame memory 18 takes out only the desired picture based on the trigger pulse and memorizes 1 frame picture in the memory and obtains a still picture by supplying the stored signal to a Brown tube 13 as a continuous signal. Audio regenerator 19 takes out a desired audio signal based on the trigger pulse and reproduces the voice by supplying said signal to a speaker 14.

Figure 4:
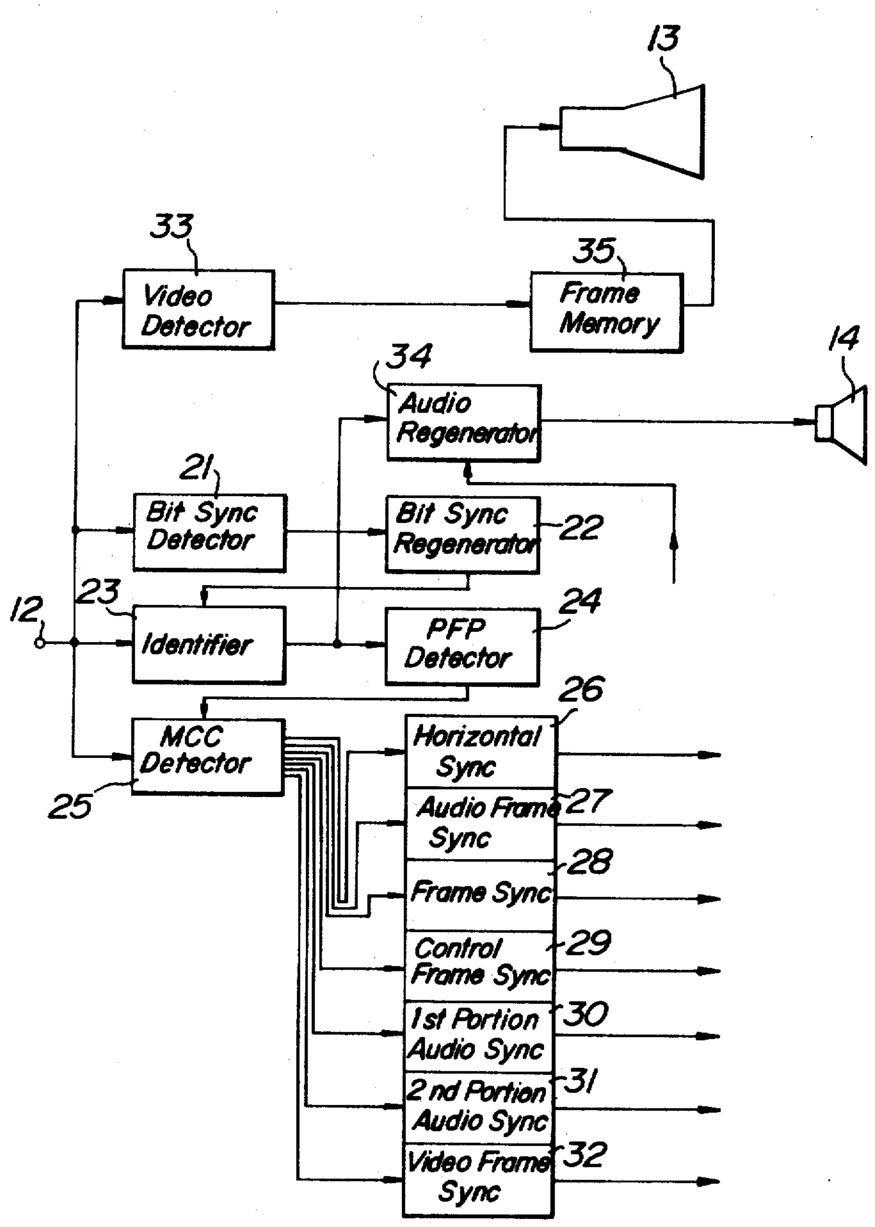

More details of the receiver of the still picture broadcasting system are shown in FIG. 4. In FIG. 4, 12 shows the input terminal to which the still picture broadcasting signal is supplied. 21 is a bit synchronization detector, which detects a timing wave and PFP signal out of the audio or the video frame and supplies them to a bit synchronizing signal regenerator 22. The bit synchronizing signal regenerator 22 has a basic oscillator oscillating at a frequency equal to the bit repetition frequency of the PFP signal and provides a reproduced bit synchronizing signal having the same phase and frequency with those of the supplied input timing wave and supplies it to an identifier 23. The identifier 23 utilizes said reproduced synchronizing signal as the timing wave and identifies the PFP signal, MCC signal and pulse code modulated audio signal in the still picture broadcasting signal and also effects waveform shaping. The identified signal is supplied to an audio regenerator 23 and to PFP detector 24. The PFP detector 24 compares the identified signal with a fixed pulse pattern having a sequence of the PFP signal as shown in FIG. 2*d* and produces a pulse when the identified signal has the same pulse pattern as the fixed pulse pattern. Accordingly, by the pulse produced from the PFP detector 24, the location of the PFP signal is identified. This pulse is supplied to the MCC detector. After the detection of the position of the PFP signal in the PFP detector 24, the detected PFP signal is supplied to the MCC detector 25. In the MCC detector 25, an 8 bit MCC signal may easily be derived. If the MCC signal is detected in the MCC detector 25, as the respective positions of the 7 kinds of the synchronizing signals in the MCC signals are known, the synchronizing signals may easily be derived and reproduced. The 7 synchronizing signals are supplied to horizontal synchronization circuit 26, audio frame synchronization circuit 27, frame synchronization circuit 28, control frame synchronization circuit 29, 1st portion audio frame synchronization circuit 30, 2nd port audio frame synchronization circuit 31, and video frame synchronization circuit 32, respectively and the 7 kinds of synchronization signals may be reproduced. The repetition periods of the 7 synchronizing signals are 15.734 KHz, 10.5 KHz, 30 Hz, 1 Hz, 10 Hz, 10 Hz, 10 Hz, respectively. In the receiver of the present invention, the still picture video signal detected in the video detector 33 is memorized in the frame memory 35 and is repeatedly supplied to the Brown tube 13 as an NTSC signal. By constructing such a form of circuit, a normal NTSC receiver is used as a monitoring receiver for the still picture broadcasting signal.

The pulse code modulated (PCM) signal identified and shaped in the identifier 23 and supplied to the audio regenerator 34 is controlled by control signals supplied from the controller 17 and is detected by necessary pulses and is reproduced as a normal audio signal by a digital to analog converter and is supplied to the speaker 14.

Figure 5:
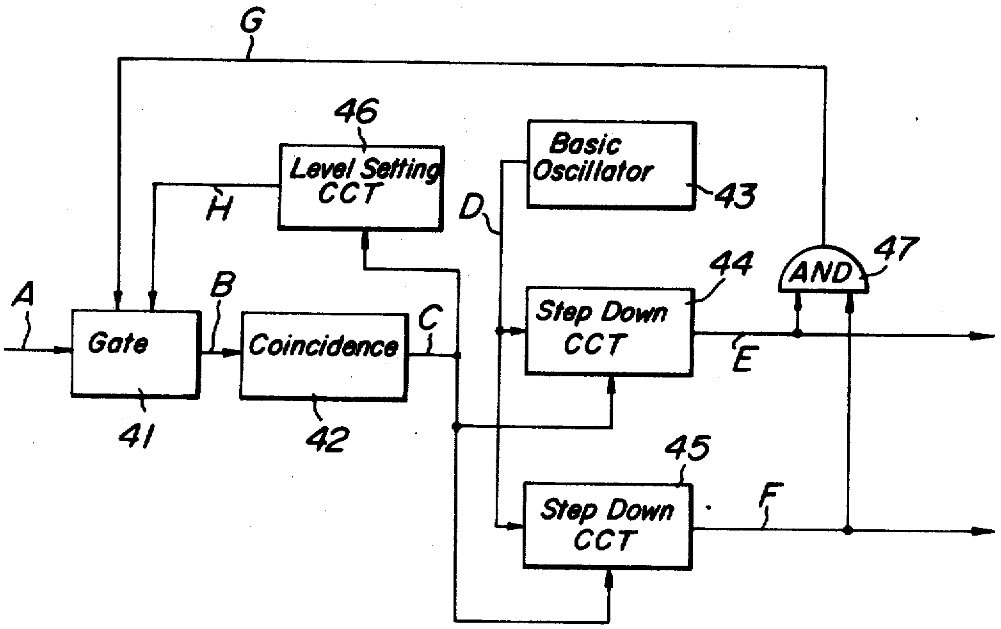
FIG. 5 is a block-diagram of a synchronizing signal regenerator used in the receiver of the present invention.
Figure 6:
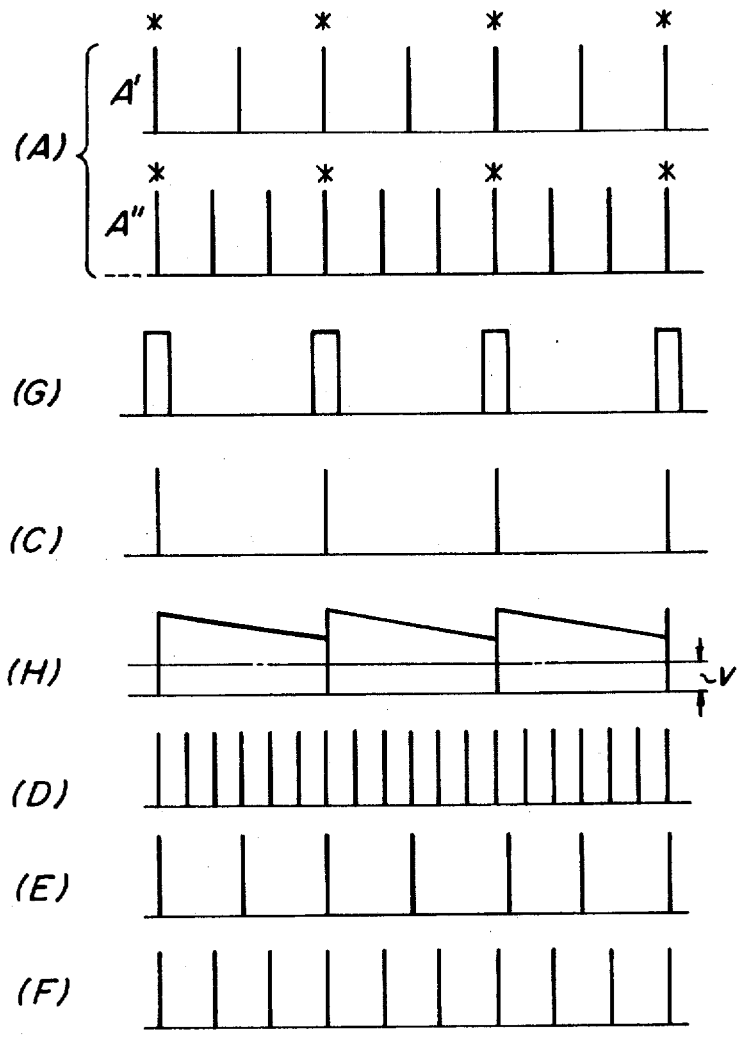
FIGS. 6 and 7 are waveform diagrams for explaining the operation of the circuit shown in FIG. 5.

FIG. 5 shows a block diagram of the synchronizing signal regenerator which is a part of PFP detector 24, MCC detector 25, horizontal synchronization circuit 26 and audio frame synchronization circuit 27 used in the receiver of the invention shown in FIG. 4. In FIG. 5, A, B, C, . . . H represent various signals at the various portions of the circuit and the waveforms of the signals A to H are shown in FIG. 6. The present embodiment is used to regenerate the two kinds of periods of the input signal as shown in FIG. 2, in which the input signal is transmitted in time division multiplex system with two kinds of periods of $1/f_H$, $1/f_A$, wherein $f_H/f_A=3/2$ and $f_H=15.734$ KHz, by using the greatest common measure frequency of about 5 KHz. In the FIG. 5, 41 represents a gate circuit, 42 a coincidence circuit, 43 a basic oscillator, 44, 45 stepdown circuits, 46 a gate threshold level setting circuit which is an example of a coincidence checking circuit, and 47 an AND gate. The gate circuit 41 is a circuit for gating out the input signal at the greatest common measure frequency of the two frequencies of $1/f_A$ and $1/f_H$.

The operation of the synchronizing signal generator shown in FIG. 5 will be explained by referring to the waveform diagram shown in FIG. 6. In FIG. 6, the synchronizing signal portions of PFP and MCC are expressed by a combined one line for reasons of simplicity.

In the input signal generally indicated in FIG. 6A, two synchronizing signals of the two periods as shown in FIGS. 6A' and 6A'' are transmitted in time division multiplex. The synchronizing signal shown in FIG. 6A' has the repetition frequency $f_A$ and that shown in FIG. 6A'' has the repetition frequency $f_H$. In these two series of synchronizing signals, the asterisk mark "*" shows synchronizing signals coincident in the two series. The repetition frequency of the synchronizing signals attached with the asterisc mark is the greatest common measure frequency of the two repetition frequencies. The above input signal A passes a gate circuit 41 and is supplied to a coincidence circuit 42 as indicated B in FIG. 5. In the coincidence circuit 42, at a time of coincidence of the input signal A to the period of the above-mentioned greatest common frequency, a coincidence pulse C is generated. This coincidence circuit 42 is given an input pulse signal from the identifier 23 at each bit. The coincidence circuit 42 checks the pattern of the input pulse signal having a predetermined bit number by bit timing and produces an output pulse only when an input pulse pattern of the instant is coincident to a previously determined fixed pulse pattern.

Figures 11, 12:
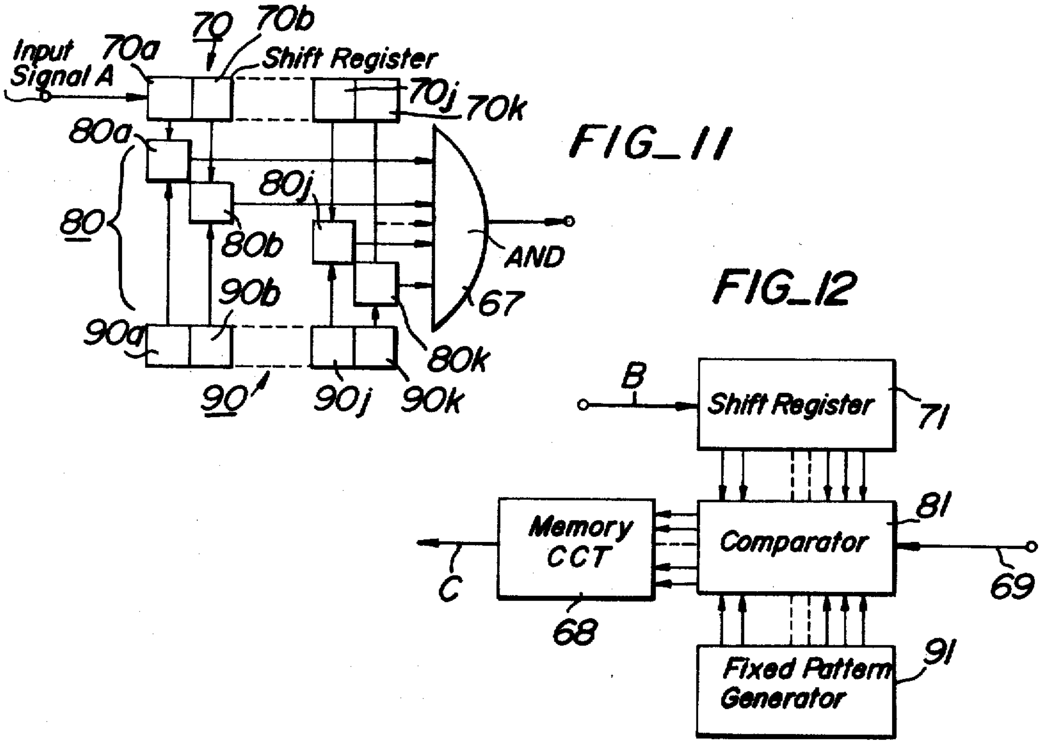
FIGS. 11 and 12 are block-diagrams for explaining one embodiment of a coincidence circuit indicated in FIGS. 5, 8, 9 and 10.

One practical embodiment of the coincidence circuit 42 is shown in FIG. 11. In FIG. 11, an input signal A is supplied to a shift register 70, and the pulse pattern of the input signal is compared at each bit in a comparator 80 with a previously fixed pattern supplied from a fixed pattern generator 90.

This fixed pattern generator 90 is not a circuit to produce a pulse signal in which the voltage is varied with time, but is a circuit to product a dc voltage of predetermined number and value corresponding to those of 1 and 0 of the respective pulses forming the PFP signal. For instance, the fixed pattern generator 90 is formed by a series of dc voltage sources 90a, 90b . . . 90k each of which is able to settle a voltage. Said respective voltage sources 90a, 90b . . . 90k are provided in a number corresponding to 16 bits. The output level of the sources 90k and 90j is made at a lower level or earth level, and the level of the preceding voltage source is made at a higher level, the next preceding voltage is made again at a lower or earth level and thus the levels are settled alternately as high and low levels so as to obtain 16 output levels such as is expressed by 001010 . . . Each output of respective voltage sources 90a, 90b . . . 90k is supplied to each bit comparator 80a, 80b . . . 80k of the bit comparator 80. The shift register 70 is settled to store the 16 bits digital signal. When the shift register is given an input of the 16 bits pulse PFP signal as shown in FIG. 2d, all the output levels of the shift register coincide with the output levels of the dc voltage sources 90a, 90b . . . 90k. Accordingly, all the bit comparators 80a, 80b . . . 80k produce output pulses simultaneously. The outputs from all of the bit comparators 80a, 80b . . . 80k are supplied to an AND gate 67. Therefore a coincidence pulse is delivered at an output of the AND gate 67 only when all the bit comparators 80a, 80b . . . 80k produce pulse signals simultaneously, i.e., only when the shift register 70 is given an input pulse code corresponding to the PFP signal.

In order to produce the coincidence pulse series at a period of the greatest common measure frequency of the repetition frequency of the synchronizing signal inserted in the video signal transmission period and of the repetition frequency of the synchronizing signal inserted in the audio signal transmission period, namely, of the greatest common measure frequency of the frequencies $f_H$ and $f_A$, the pulse bit number of the fixed pulse pattern to be compared in the coincidence circuit 42 is made to a number of the sum of the PFP signal and a part of MCC signal. The MCC signal has a shape as shown in FIG. 2 (d). The first bit of the MCC signal is always 0. The second bit, pulse 5 is 1 when the repetition period in which the MCC signal is inserted coincides with the repetition period of the horizontal synchronizing frequency $f_H$, and is 0 in the other repetition period. The third bit pulse 6 is 1 when the repetition period including the MCC signal coincides with the repetition period of the audio frame synchronizing signal frequency $f_A$ and is 0 at the other repetition period. The repetition period, in which a MCC signal having both pulses 5 and 6 1 at the same time is inserted, is the repetition period of the greatest common measure frequency of $f_H$ and $f_A$. Therefore, if the fixed pulse pattern of the coincidence circuit 42 is so settled as 001010 . . . 10011 by 19 bits consisting of a sum of 16 bits of the PFP signal and the initial 3 bits of the MCC signal, a coincidence pulse having the greatest common measure frequency of $f_A$ and $f_H$ is obtained.

Thus, the obtained coincidence pulse C is supplied to stepdown circuits 44 and 45 as the reset pulse. In the stepdown circuits 44 and 45, the output basic oscillation signal D supplied from a basic oscillator 43 is stepped down and signal E and signal F having the frequency $f_A$ and $f_H$, respectively are produced and the phases are adjusted to synchronize with the coincidence pulse C. In this case the coincidence pulse C has the greatest common measure frequency of the frequencies $f_H$ and $f_A$ so that the repetition frequency is one-third of that of the horizontal scanning frequency $f_H$ and one-half of that of the audio frame frequency $f_A$. The timing of the coincidence pulse C coincides with phases of the horizontal synchronizing signal and the audio frame synchronizing signal. Therefore, if the coincidence pulse C is made as a reference of the phase, the phase control of the reproduced audio frame synchronizing pulse signal is effected at a rate of 2 to 1. In the same manner, the phase control of the reproduced horizontal synchronizing pulse signal is effected at a rate of 3 to 1. However, even by this control principle a substantially same effect may be expected as in the case of applying the phase control for all of the pulses of the reproduced synchronizing signal by a reason set forth below. By using a counter which produces a pulse and resets itself and restarts the counting after counting a predetermined number of pulses of the input signal, namely by using the stepdown circuits 44 and 45, a pulse signal having a repetition period equal to the repetition period of the audio frame synchronizing signal and the horizontal synchronizing signal is obtained since the output signal of the oscillator 43 is counted by the stepdown circuits 44 and 45. By applying said coincidence pulse to the stepdown circuits 44 and 45 as the reset pulse, a stepdown signal having the correct phase is obtained since timing for starting the count coincides with the synchronizing signal as far as the oscillation frequency of the basic oscillator 43 is stable. Accordingly, a correct phase reproduced synchronizing signal can be obtained by making phase control at a rate of once in two pulses or once in three pulses.

The output synchronizing signals E and F, synchronized with the input signal A, are supplied to an AND gate 47. The AND gate 47 produces an output pulse G having the greatest common measure frequency of $f_A$ and $f_H$ and having the same phase with the input signal. The output pulse G is supplied to the gate circuit 41 to gate out the input signal. By the above means an input synchronizing signal is obtained in a good S/N condition and a very stable synchronization circuit can be obtained.

Then the operation of the gate threshold level setting circuit 46 having the function of a coincidence confirming circuit will be explained. The gate threshold level setting circuit 46 makes peak detection of the coincidence pulse C and produces a signal as shown in FIG. 6H. The gate circuit 41 opens the gate by the gate pulse when the signal H has a value higher than a threshold level $v$ shown in FIG. 6H and if the signal H has a value lower than the threshold level then the input signal A is directly supplied to the coincidence circuit 42 by removing the gate.

Figure 7:
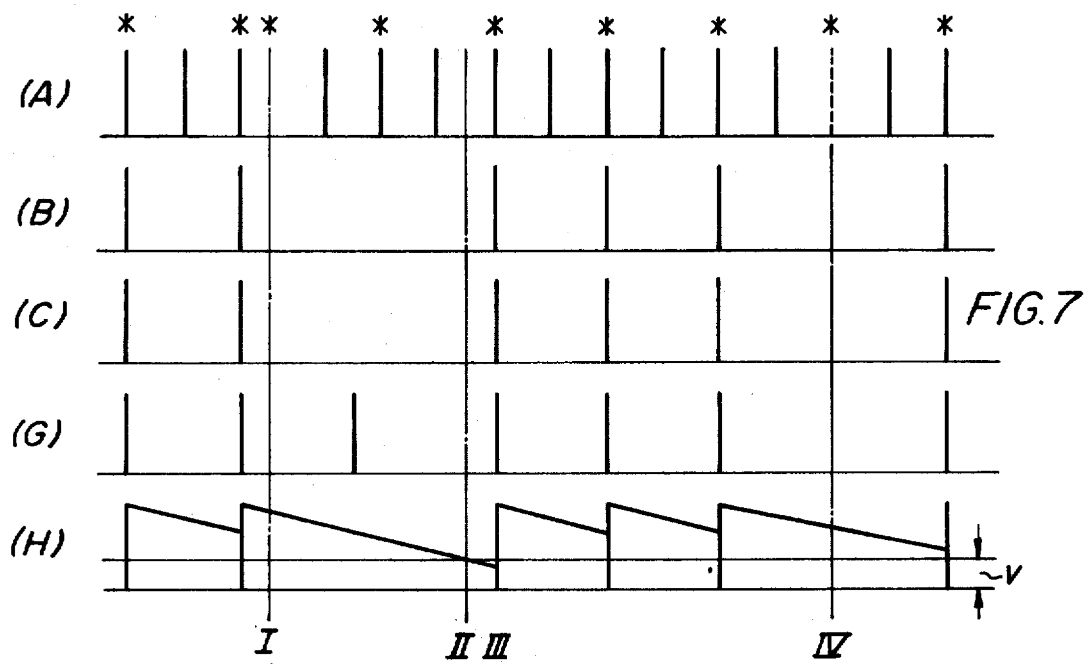

FIG. 7 shows waveforms of various portions when the phase matching in the stepdown circuits 44 and 45 is missed by some reason. At an instant I in FIG. 7, in an instant when the frame frequency is $f_H$, it is assumed that the phase of the input pulse A is changed. In this case as the gate circuit 41 is operating, the gate circuit produces no output B and accordingly no coincidence output pulse C appears at the output of the coincidence circuit 42. Then the output voltage H from the threshold level setting circuit decreases gradually and finally at an instant II it reaches at the threshold level $v$. After becoming lower than the threshold level $v$, the gate 41 is released and the input signal A is directly applied to the coincidence circuit 42. Therefore the succeeding synchronizing signals of the greatest common measure frequency may be detected and a coincidence pulse C can be produced. The coincidence pulse C is applied to the stepdown circuits 44 and 45 and instantaneously adjusts the phase of the output pulses G and H to coincide with the synchronizing pulses 2 and 4. At the same time the pulse applied to the gate threshold level setting circuit 46 instantaneously changes its output voltage H higher than the threshold level $v$, and the gate circuit 41 again commences gating. In this time the frequency of the gate pulse G perfectly coincides with the greatest common measure frequency of the input synchronizing signal and after the instance III when the phase is in coincidence, only the abovementioned correct synchronizing signals 2 and 4 may be gated out. Accordingly by the gating, the synchronous detection of the coincidence pulse C is effected.

It is possible that the coincidence pulse can be produced accidentally, and erroneous information given to the synchronizing circuit by a signal having an identical pattern with that of the PFP signal and the MCC signal appearing incidentally, when the gate is open at the starting time of the operation of the synchronizing circuit or when the synchronization is missed for some reason. According to the present invention, however, such erroneous information is removed immediately. When a signal having a pattern to be detected by the coincidence circuit is produced incidentally, other than the PFP signal and the MCC signal, a coincidence pulse is produced and as a result the gate operates once at timing different than the portion where the PFP signal and the MCC signal exist. However, as such a pulse pattern does not have regular periodicity, it will be brought to the input continuously. Due to opening of the gate at the erroneous repetition period, the proper synchronizing signal can not pass the gate and hence the coincidence pulse ceases to occur. At a lapse of a certain time after the discontinuation of the occurrence of the coincidence pulse, the gate remains in an open condition. By this opening of the gate the PFP signal and the MCC signal are supplied immediately to the coincidence circuit so that only the synchronizing signal having the greatest common measure frequency of $f_A$ and $f_H$ having the common repetition period for those of the audio frame synchronizing signal and the horizontal synchronizing signal is correctly detected. Instant IV indicates a condition that the input signal is disturbed by noise or the like and the PFP is disturbed at least one bit. In this case no coincidence pulse is generated but the threshold level setting output voltage H does not come down below the threshold level and detects synchronizing signals 2 and 4 at the next greatest common measure frequency and maintains a proper operating condition.

Figure 8:
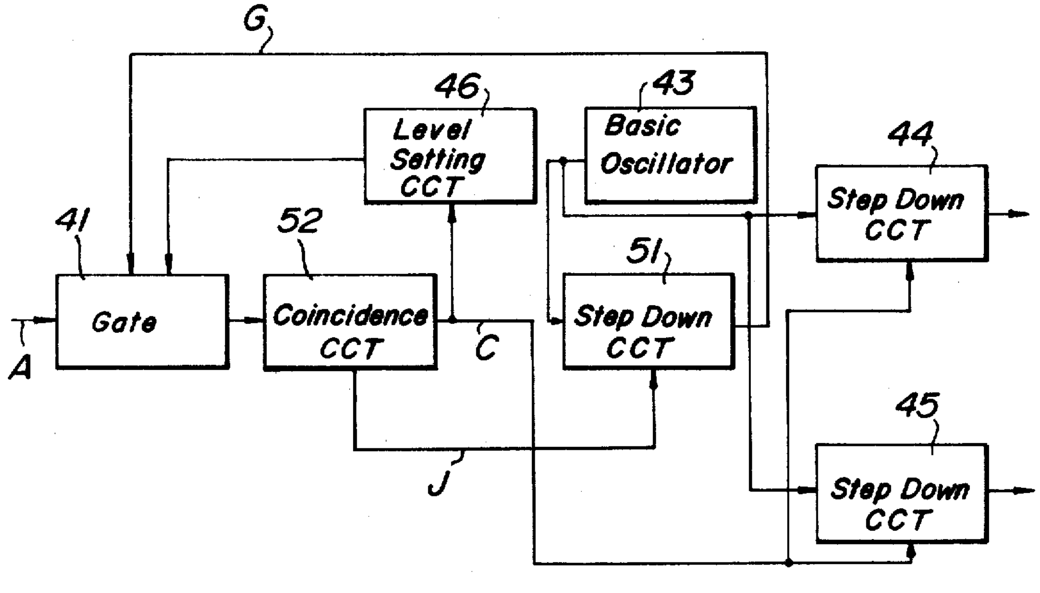
FIGS. 8, 9 and 10 are block-diagrams for explaining another embodiment of a synchronizing signal regenerator used in the receiver of the present invention.

FIG. 8 is a block-diagram showing a different embodiment of the present invention. This embodiment is a case of frame synchronization pulling in by means of the least common multiplex frequency.

Since the circuit shown in FIG. 8 only partly differs from that shown in FIG. 5, only the different portions may be explained hereinafter. The most different portion from FIG. 5 is that the frequency of the gate pulse G is selected to be the least common multiplex frequency of $f_A$ and $f_H$. Said least common multiplex frequency is provided by a basic oscillator 43 through a stepdown circuit 51. The reset pulse of the stepdown circuit 51 is provided by a coincidence circuit 52. The connection of the coincidence circuit 52 is slightly modified from that of the previously explained coincidence circuit 42 (FIG. 5). The coincidence circuit 52 supplies the coincidence pulse C to the gate threshold level setting circuit 46 and stepdown circuits 44 and 45 is shown in FIG. 5, but beside the coincidence pulse C a coincidence pulse J is reproduced by comparing the input signal and a fixed pulse pattern having a pulse coded mode which is the same as the mode of the PFP signal. The coincidence pulse J is supplied to the stepdown circuit 51 as a reset pulse. An output pulse of the stepdown circuit 51 is used as a gate pulse of the gate circuit 41. In this case as the gate circuit 41 is gated by the least common multiplex frequency, the coincidence pulse J acts not only as a coincidence pulse for the greatest common measure synchronizing signals 2 and 4 but it acts as a coincidence pulse for all the PFP signals of the synchronizing signals 2 and 4. By this manner by gating by the least common multiplex frequency an identical characteristic with the previously mentioned example can be obtained.

Figure 16:
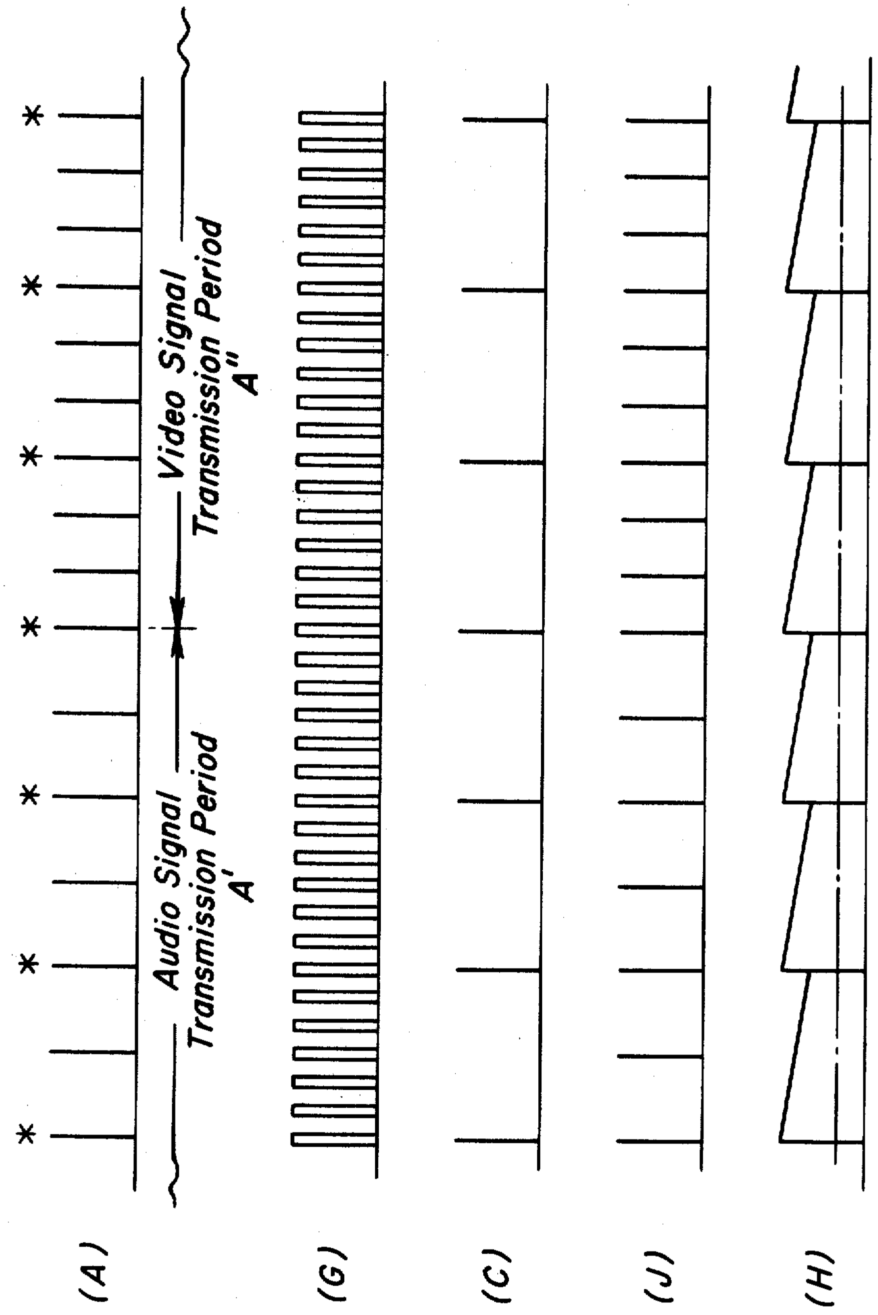
FIG. 16 shows signal waveform diagrams useful for explaining the operation of the circuit of FIG. 8.

FIG. 16 shows a timing chart of waveforms at the main portion of the circuit. FIG. 16-(A) shows a synchronizing signal of the input signal as is shown in FIG. 6, in which the left half portion has a repetition frequency of $f_A$ and the succeeding right half portion has a repetition frequency of $f_H$. As is shown in FIG. 6, the synchronizing signals attached with an * mark are the signals having coincident phase for both of the repetition frequencies. FIG. 16-(G) shows a series of gate pulses obtained from the stepdown circuit 51 and having a repetition frequency of the least common multiple number of the $f_A$ and $f_H$. FIG. 16-(C) shows coincidence pulses obtained by detecting the PFP signal and a part of the MCC signal showing $f_A$ and $f_H$ detected by the coincidence circuit 52 in which pulses the phase is coincident with those attached with * marks in FIG. 16-(A). FIG. 16-(J) shows coincidence pulses obtained only by detecting the PFP signal in the coindicence circuit 52 having a coincident phase with the synchronizing signal A of input signal. FIG. 16-(H) is the waveform of a signal produced by the gate threshold level setting circuit 46 used for the switching operation of the gate circuit 41 as is shown in FIG. 6. As shown in FIG. 16, even if the gate is opened at a point where the PFP signal does not exist and an input signal is supplied to the circuit 52, the coincidence pulse will not appear as long as a pulse pattern which is the same as that of the PFP signal does not exist. Accordingly, by the circuit shown in FIG. 8, a signal *c* having a common repetition frequency for both the frequencies $f_A$ and $f_H$ is obtained in the same manner as the circuit shown in FIG. 5.

Figure 9:
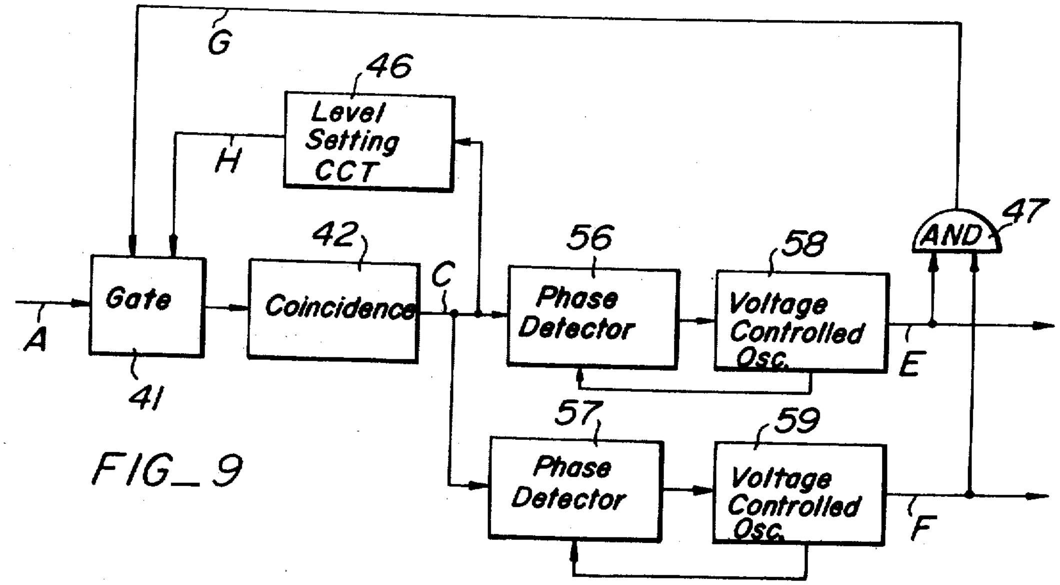

FIG. 9 is a block-diagram of a still further embodiment of the present invention. In this embodiment, the different point is a provision of two independent oscillators each oscillating at the frequency of $f_A$ and $f_H$, respectively. The two frequencies $f_A$ and $f_H$ are the two required frequencies as the output signal. In this embodiment, in the place of the basic oscillator 43 and stepdown circuits 44 and 45 of the circuit shown in FIG. 5, voltage controlled type oscillators 58 and 59 and phase detectors 56 and 57 are provided, while leaving the other portion unchanged. By phase controlling the oscillation output of the two oscillators 58 and 59 by two phase detectors 56 and 57, respectively, and by using the greatest common measure frequency coincidence pulse C at the output, an output synchronized with the input signal may be obtained.

Figure 10:
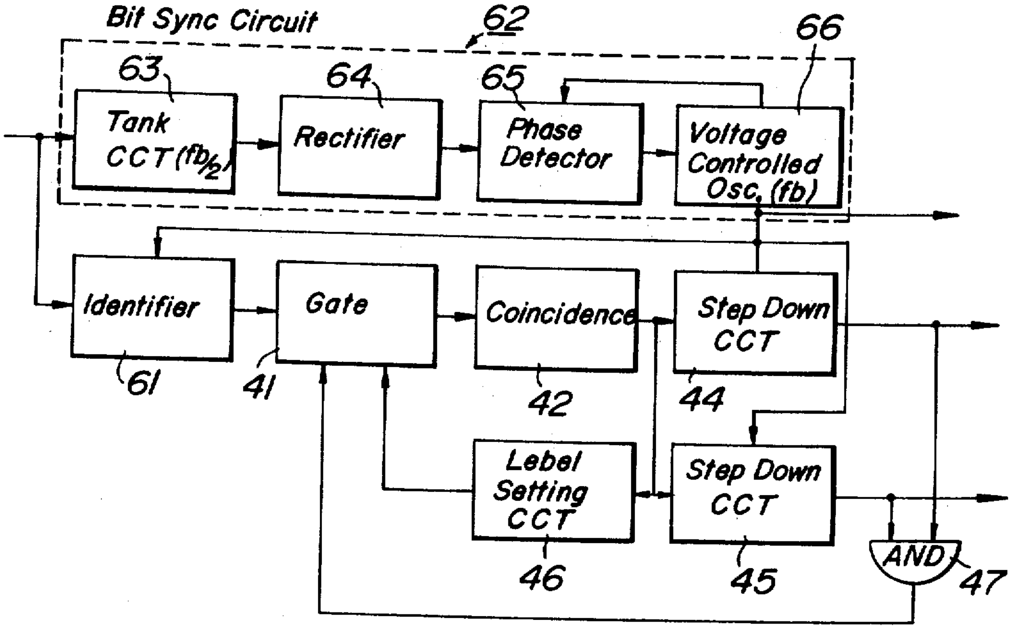

FIG. 10 is a block-diagram of a still modified embodiment of the present invention. In this embodiment, the basic oscillator of FIG. 5 is dispensed with. This circuit is used to utilize the output of the other oscillator oscillating higher than the frequencies $f_A$ and $f_H$ and used for the other circuit for a different object.

In order to demodulate the PCM signal, it is required to reproduce the bit synchronizing signal, and hence a bit synchronization circuit should be provided. The period $1/f_b$ of said bit synchronizing signal corresponds to the PFP pulse pattern shown in FIG. 2D. The embodiment shown in FIG. 10 can be applied in case that the bit frequency $f_b$ is selected to have an integer ratio relationship with the frame frequencies $f_A$ and $f_H$. The different portion in FIG. 10 from the embodiment shown in FIG. 5 is the provision of voltage controlled oscillator 66 oscillating at the bit frequency $f_b$ instead of the basic oscillator 43. This oscillator 66 is a circuit used to oscillate a bit synchronizing output for bit synchronization circuit 62 generally indicated by a broken line block. One embodiment of the bit synchronization circuit 62 is as shown in FIG. 10, and it comprises a tank circuit 63 for resonating at one-half the frequency of the bit frequency $f_b$, a rectifying circuit 64, a phase detector 65, and a voltage controlled type oscillator 66. By using the output of the oscillator 66 in the same manner as the output of the basic oscillator, the circuit shown in FIG. 10 operates in the same manner as the circuit shown in FIG. 5 and the frame synchronizing signals $f_A$ and $f_H$ may be obtained.

In FIG. 10, as an input circuit for the gate circuit 41, an identification circuit 61 is shown. Although this circuit has no direct relation with the construction of the present invention, this circuit is an indispensable circuit for the demodulation of the PCM signal and is used as a circuit for eliminating wave shape distortion of the input signal caused in the transmission path.

The foregoing cases correspond to a case in which no protection circuit is provided for the coincidence circuit 42 or 52 in the synchronizing signal deriving circuit. The coincidence circuits 42 and 52 are the circuits having the detailed construction such as shown in FIG. 11, which produces a coincidence pulse by making identification between the transmitted synchronizing signals 2 and 4 and comparing them with a previously settled fixed pattern at the time of coincidence of all the patterns therebetween. However, when the bit number of the fixed pattern becomes large or in case impulsive noises are mixed in the transmitted signal then there is a need to consider protection for the coincidence pulse. In such a case, the PFP coincidence circuit is modified as shown in FIG. 12.

In FIG. 12, 71 is a shift register, 81 a comparator, 91 a fixed pattern generator, 68 a memory circuit and 69 a timing signal applying terminal. The gated out synchronizing signals 2 and 4 are kept in the shift register 71 and by applying a timing signal to the terminal 69 to adjust the timing, the stored synchronizing signals are compared with the output of the fixed pattern oscillator 91 bit by bit. This one bit coincidence pulse is applied to a memory circuit 68. The memory circuit 68 stores such one bit coincidence pulse and when the stored number of the one bit coincidence pulse becomes equal to a certain number, the circuit assumes that the full coincidence pulse is present and the coincidence pulse output C is sent out.

By the above provision, a stabilized synchronizing signal output can be obtained even if a part of the PFP signal is lost due to outer noise.

As mentioned above, according to the present invention, the synchronizing signal regeneration of the same phase with the transmitted synchronizing signals may be obtained even when the synchronizing signals are given two different repetition frequencies and transmitted in time division multiplex.

An example of an automatic gain controlling circuit (hereinafter bridged as AGC circuit) which may be used in the receiver of the present invention will be explained.

The AGC circuit of the embodiment is a circuit to produce an AGC voltage by detecting the level of the pause period of the input composite signal of a signal period by using the output signal G of the AND circuit 47 of the synchronizing signal regenerator as has been explained with reference to FIGS. 5, 8, 9 and 10.

Figure 13:
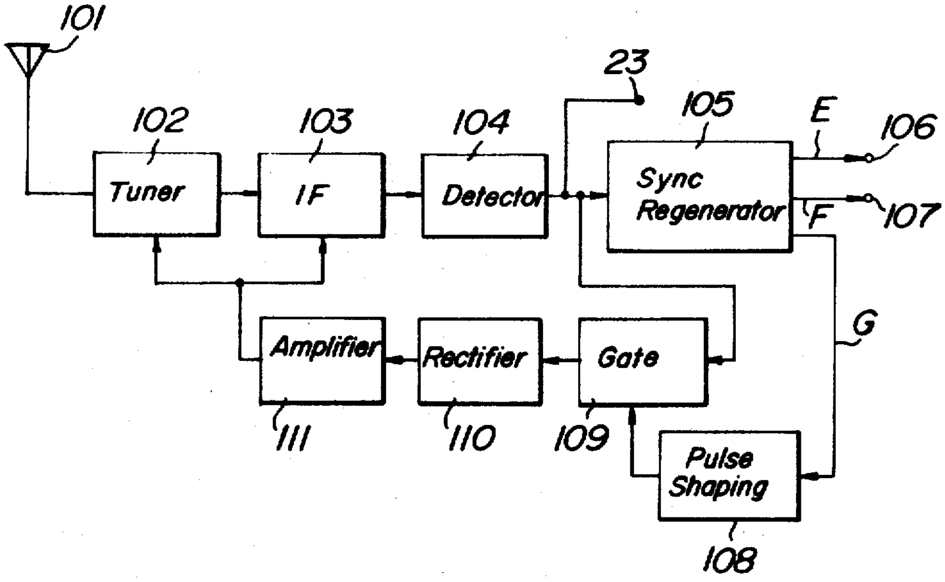
FIG. 13 is a block-diagram of an embodiment of an automatic gain control circuit used in the receiver of the present invention.

FIG. 13 is a block-diagram of an embodiment of the automatic gain controlling equipment of the present invention using the synchronizing signal regenerator. In FIG. 13, 101 is an antenna, 102 a tuner, 103 an intermediate frequency amplifier, 104 a detector and 105 is a synchronizing signal regenerator such as shown in FIGS. 5, 9 and 10. 108 is a pulse shaping circuit, 109 a gate circuit, 110 a rectifier, 111 an amplifier. As in an ordinarly television receiver, the composite still picture signal is fed through the antenna 101, tuner 102, and intermediate frequency amplifier 103, and the signal is detected by a detector 104 and forms a composite signal having the base band component. This composite signal is applied to a synchronizing signal regenerator 105 and in a manner as explained previously, the two kinds of synchronizing signals E and F having frequencies $f_A$ and $f_H$ are regenerated at output terminals 106 and 107, respectively, and also a synchronizing signal G having the greatest common measure frequency of about 5 KHz of both the two synchronizing signals E and F is produced at the output of an AND circuit 47. One part of this signal G is supplied to a pulse shaping circuit 108 and by suitably adjusting the phase of the pulse to become advanced or lagged a gate pulse having a suitable pulse width is obtained. This gate pulse is supplied to a gate circuit 109 and the output composite signal of the detector 104 is gated out at a period of the greatest common measure frequency of about 5 KHz of the two frequencies of $f_A$ and $f_H$ to gate the pause period shown in FIG. 2D. The signal level of the sampled pause period by the period corresponding to a frequency of about 5 KHz is rectified by a rectifier 110 and a DC voltage in proportion to the sampled signal level is obtained. This voltage is amplified to a suitable amplitude by an amplifier 111 and is supplied to a tuner 102 and an intermediate frequency amplifier 103 as the AGC voltage to effect an automatic gain control, and an amplitude stabilized composite signal is obtained from the output 23.

As mentioned above, according to the present invention, the input signal for the base of the AGC voltage is detected in the same period in either of the video period and audio period so that no ripple is produced due to the difference of the repetition frequencies of the synchronizing signals in the transmitted composite signal; therefore, a stabilized automatic gain control can be obtained.

A practical embodiment of a clamp circuit which can be used in the receiver of the present invention will be explained.

The clamp circuit is designed to utilize a signal produced by the synchronizing signal regenerator as explained with respect to FIGS. 5, 8, 9 and 10.

Figure 14:
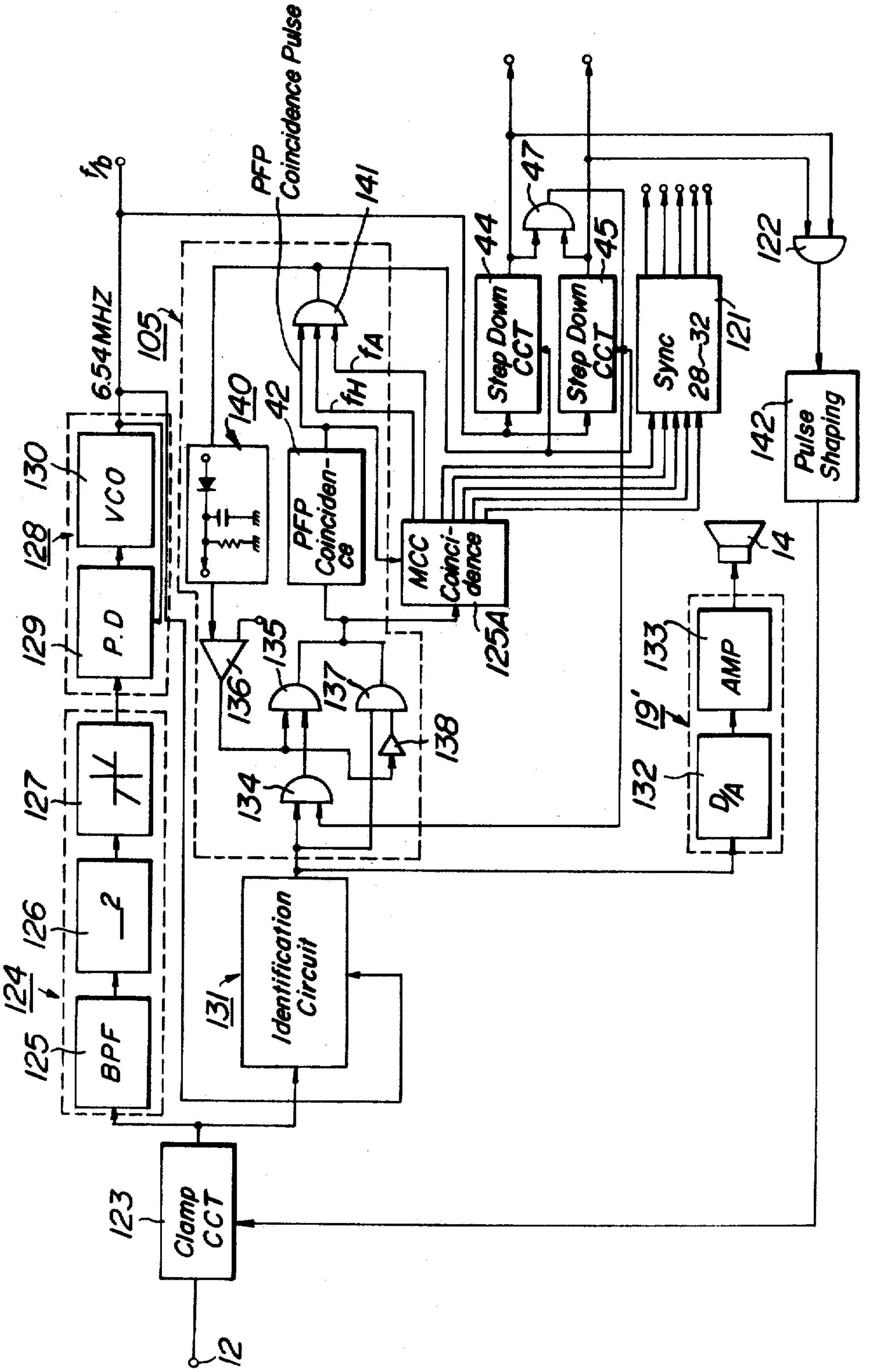
FIG. 14 is a block-diagram showing more practical detail of the receiver made in accordance with the present invention.

FIG. 14 is a practical embodiment of a receiver according to the present invention. In FIG. 14, 105 is a synchronizing signal regenerator, 125A a MCC signal coincidence circuit, 44 and 45 stepdown circuits for obtaining the horizontal synchronizing signal $f_H$ and audio frame synchronizing signal $f_A$, 121 a synchronizing signal regenerator for obtaining the other synchronizing signal, 47 an AND gate (refer to FIG. 10), 122 an AND gate, 123 a clamp circuit, and 19' an audio regenerator (refer to FIG. 3).

The bit synchronizing signal detection circuit 124 comprises a band pass filter 125 for selecting the bit synchronizing signal frequency component, a circuit 126 having a square curve characteristic such as a detector, and an amplifier selecting circuit 127 for detecting a signal having an amplifier exceeding a previously determined value. The bit synchronizing signal detection circuit 124 detects a signal component having the bit synchronizing signal frequency from the input signal. By using such detected signal and by combining a phase detector 129 and voltage controlled type oscillator 130 synchronization of the bit synchronizing signal regenerator 128 is obtained and a bit synchronizing signal of about 6.54 MHz synchronized with the input signal is obtained. The regenerated bit synchronizing signal is used as the timing pulse and the input signal is identified by the identification circuit 131, and a pulse signal having the corrected waveform is obtained. As for this identification circuit 131 various known identification circuits may be used. For instance, a well known comparator may be used and to one input thereof a bit synchronizing signal having a previously settled level is supplied as a reference signal and to the other input the signal to be identified is supplied. The identified input signal is obtained at the output of the comparator. The input signal identified and waveform shaped by the identification circuit 131 is supplied to PFP detecting circuit 105 and to audio regenerator 19'.

The audio regenerator 19' basically comprises a digital-analog (D/A) converter 132 and an amplifier 133. The circuit 19' makes D/A conversion of the identified PCM signal in the digital-analog converter 132 and reproduces the voice signal by a speaker 14. In practice, the voice signal is multiplied so that in the previous stage of the digital-analog converter 132, a gate circuit is provided and only a desired audio signal designated by the instruction indicator shown in FIG. 3 may be gated out and reproduced. The detail of the same is outside of the present invention so that further explanation is omitted.

In the PFP deriving circuit 105, the input signal is supplied to PFP coincidence circuit 42 either through an AND gate 137 or AND gates 134 and 135 as has been described by referring to FIGS. 5 and 10. The PFP coincidence circuit 42 comprises a fixed pattern generator for producing an identical pattern with the PFP signal in the input signal and one bit comparator. The circuit 42 produces a coincidence pulse when the PFP signal is supplied in the input signal (refer to FIGS. 11 and 12).

The same input signal as the signal for the PFP coincidence circuit 42 is supplied to a separately provided MCC coincidence circuit 125 to which the coincidence pulse from the PFP coincidence circuit 42 is also applied and respective codes for corresponding MCC signals succeeding to the PFP signal are detected and respective coincidence pulses are produced when the code of the MCC signal is 1. Among these pulses, the coincidence pulse of the MCC signal for indicating the horizontal synchronizing signal $f_H$ and the audio frame synchronizing signal $f_A$ are applied to an AND gate 141 together with an output of the PFP coincidence circuit 42.

At the output of the AND gate 141, a pulse is delivered only when the abovementioned three coincidence pulses are applied simultaneously to the inputs of the AND gate 141 so that said output pulse has a period corresponding to the greatest common measure frequency of about 5 KHz between the horizontal synchronizing signal frequency $f_H$ (15.734 KHz) and the audio frame synchronizing signal frequency $f_A$ (10.5 KHz). Said pulse having the greatest common measure frequency is applied to stepdown circuits 44 and 45 as the reset pulse. The stepdown circuits 44 and 45 function to count down the output reproduced signal (about 6.54 MHz) of the bit synchronizing signal regenerator 128 in a ratio of 1/416 and of 1/624, respectively, and to reproduce the horizontal synchronizing signal and the audio frame synchronizing signal.

By applying thus obtained horizontal synchronizing signal and audio frame synchronizing signal to an AND gate 47, an output pulse having the greatest common measure frequency of the frequencies $f_H$ and $f_A$ which is the same as the output of the AND gate 141 can be obtained. By applying this pulse to an AND gate 134, it is possible to derive from the input signal of the synchronizing signal portion of the PFP and MCC signals only the portion corresponding to the period of the greatest common measure frequency of the frequencies $f_H$ and $f_A$, so that a stable synchronizing signal reproduction is obtained by eliminating an unnecessary portion of the input signal.

In the transient condition, such as the beginning of the operation of the device, the derived signal from the stepdown circuits 44 and 45 is not in synchronism with the input synchronizing signal, so that the gate signal made from the derived signal or the gated out input signal from the output of the AND gate 47 at the output of the AND gate 134 may not include a portion of the synchronizing signal. In such condition, the synchronization is not obtained, so that at such transient all the input signals should be supplied to PFP coincidence circuits 42 and an early detection of the synchronizing signal is required. For this object a path is provided for supplying the input signal without gating it out. This circuit is the circuit including an AND gate 137 and is used during the period in which the frame synchronization is not attained. The ungated input signal is passed through the AND gate 137. After the frame synchronization is obtained, the gated out input signal is applied through an AND gate 135. This switch over may be effected in the following manner.

When the PFP coincidence pulse and a coincidence pulse between the horizontal synchronizing signal and the audio frame synchronizing signal are obtained, a pulse having a period corresponding to the greatest common measure frequency of the frequencies $f_H$ and $f_A$ is obtained at the output of the AND gate 141 as explained before. When this pulse is obtained, the frame synchronization is established, so that the pulse may be applied to an integrating circuit 140 to hold a certain voltage for a certain period. This voltage is supplied to a control circuit 136 which produces a 1 output signal during the time when the voltage over a predetermined voltage level is applied and produces a 0 output during the time the applied voltage decreases lower than said voltage level. The output of the control circuit 136 is applied to a reverse circuit 138 and to an AND gate 135 which passes the gated out input signal. The reverse circuit 138 produces a 0 signal output when a 1 signal is applied to its input and supplies a 1 signal output when a 0 signal is applied to its input. The output of the reverse circuit 138 is applied to an AND gate 137 which passes the ungated input signal. When no pulse signal is obtained at the output of the AND gate 141, i.e., when the frame synchronization is not attained, a 0 signal from the control circuit 136 is applied to the AND gate 135 and to the reverse circuit 138. Accordingly, the gated out input signal cannot pass the AND gate 135 but as a 1 signal is obtained at the output of the reverse circuit 138, the ungated input signal passes the AND gate 137 and is applied to the PFP coincidence circuit 42 and to MCC coincidence circuit 125A.

As mentioned above, the bit synchronizing signal, horizontal synchronizing signal and the audio frame synchronizing signal may be regenerated. The other synchronizing signals are supplied to respective synchronizing signal regenerators 121 by obtaining respective coincidence pulses by the MCC coincidence circuit and are used in the required circuit.

As mentioned above, a synchronizing signal having the greatest common measure frequency of about 5 KHz of the frequencies $f_H$ and $f_A$ is obtained in the same manner at the output of the AND gate 47 as by applying the two regenerated synchronizing signals $f_H$ and $f_A$ obtained at the outputs of the stepdown circuits 44 and 45 to the AND gate 122. The signal is supplied to a waveform shaping circuit 142 to adjust a suitable phase which is either advanced or lagged, and a pulse coincident to the pause period is produced. The pulse is supplied to a clamp circuit 123 so that the input signal is clamped only when the pulse is supplied, then both the video frame and the audio frame are treated to clamp the level at a same repetition period of about 5 KHz so that a stable clamping is obtained without causing ripple of 10 Hz. The synchronizing signal having a frequency of a common measure frequency of the frequencies $f_H$ and $f_A$ may be obtained by utilizing an output of the AND gate 47 by dispensing the aforementioned AND gate 122 when the synchronizing signal regenerator having a circuit as indicated in FIG. 5 is utilized.

Figure 15:
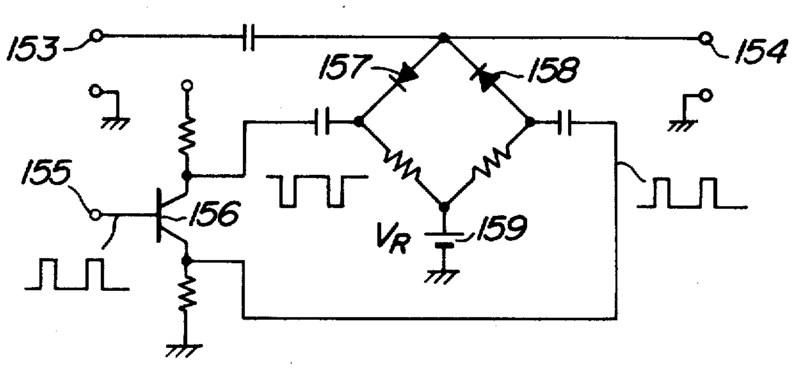
FIG. 15 is a circuit diagram of an embodiment of a clamp circuit shown in the circuit of FIG. 14.

FIG. 15 shows one embodiment of a practical circuit of the clamp circuit 123. This circuit may be termed as a synchronous clamp circuit, in which 153 is an input terminal to which the still picture signal is supplied and 154 is an output terminal. 155 is an input terminal of the pulse signal and 156 is a transistor for making the input pulse into two pulse signals having positive and negative polarities. 157 and 158 are diodes for clamping. 159 is a source of reference voltage ($V_R$) for clamping.

By applying the pulse coincidence to the pause period as shown in FIG. 2D at the repetition frequency corresponding to the greatest common measure frequency of the frequencies $f_H$ and $f_A$ obtained from the pulse shaping circuit 142 to a pulse signal input terminal 155 the diodes 157 and 158 become conductive in synchronism with said pulse. Accordingly, during the period in which the diodes 157 and 158 are conductive, the level of the pause period in the input signal supplied to the input terminal 153, of which the direct current component is blocked by a condenser, is clamped to a reference voltage level and a still picture signal having its DC level fixed to the reference voltage is obtained from the output terminal 154.

As mentioned above, according to the present invention suitable clamping is obtained even in case the repetition period of the pause period in the synchronizing signal is different in the video frame and in the audio frame.

What is claimed is:

1. A receiver for receiving a composite signal having a video signal and an audio multiplex signal transmitted alternately in a predetermined sequence, the video signal and the audio multiplex signal including respective pulse coded synchronizing signals having different repetition frequencies in the video signal transmission period and in the audio multiplex signal transmission period wherein parts of the two pulse coded synchronizing signals inserted in said video signal and said audio multiplex signal have an identical pulse coded mode at a common measure frequency of the two repetition frequencies of said pulse coded synchronizing signals, wherein the receiver comprises:

- a coincidence circuit for generating a coincidence signal having a frequency of the common measure frequency of said different repetition frequencies of said two pulse coded synchronizing signals when said pulse coded synchronizing signals having said identical coded mode are supplied, and
- a synchronizing signal generator means which is controlled by said coincidence signal for generating signals having the two repetition frequencies and phases of said two pulse coded synchronizing signals so as to reproduce said video signal and audio multiplex signal.

2. A receiver as claimed in claim 1, wherein the means for generating signals having said two different repetition frequencies and phases comprises first and second synchronization achieving signal generators for generating signals having a synchronized phase with the coincidence signal when the coincidence signal is supplied, and to produce one of the two signals having repetition frequency of one of said two frequencies from the first synchronization achieving signal generator and to produce the other signal having a frequency of the other of the two repetition frequencies from the second synchronization achieving signal generator.

3. A receiver as claimed in claim 1, wherein the coincidence circuit comprises:

- a mode generator for producing output pulses having a fixed pulse coded mode which is the same as said identical pulse coded mode,
- a shift register for transferring each bit of said composite signal supplied to its input terminal and providing output pulses,
- a comparator,
- first means for producing pulses by comparing each bit of the output pulses of said shift register and each bit of the output pulses of said mode generator in said comparator when said bit of the pulse coded mode of said composite signal is equal to a corresponding bit of said pulse coded mode of said output pulses of said mode generator,
- a memory for storing pulses from said first producing means, and
- second means for producing a coincidence signal at an output of said memory, by storing said pulses in a said memory, when a predetermined number of said pulses are memorized in said memory.

4. A receiver for receiving a composite signal comprising a video signal and an audio multiplex signal transmitted alternately in a predetermined sequence, the video signal and the audio multiplex signal including respective pulse coded synchronizing signals having different repetition frequencies in the video signal transmission period and in the audio multiplex signal transmission period wherein parts of the two pulse coded synchronizing signals inserted in said video signal and said audio multiplex signal have an identical pulse coded mode at a common measure frequency of the two repetition frequencies of said pulse coded synchronizing signals, wherein the receiver comprises:

- a coincidence circuit for generating a coincidence signal having a frequency of the common measure frequency of said different repetition frequencies of said two pulse coded synchronizing signals when said pulse coded synchronizing signals having said identical pulse coded mode are supplied,
- a first signal generator for generating a signal having one of said two repetition frequencies,
- a first control means for controlling a phase of the output signal obtained from said first signal generator by the coincidence signal, and
- a second signal generator for generating a signal having the other frequency of the two repetition frequencies.

5. A receiver for receiving a composite signal comprising a video signal and an audio multiplex signal transmitted alternately in a predetermined sequence, the video signal and the audio multiplex signal including respective blanking periods and respective pulse coded synchronizing signals having different repetition frequencies in the video signal transmission period and in the audio multiplex signal transmission period wherein parts of the two pulse coded synchronizing signals inserted in said video signal and said audio mutliplex signal have an identical pulse coded mode at a common measure frequency of the two repetition frequencies of said pulse coded synchronizing signals, wherein the receiver comprises;

- a gate circuit,
- a coincidence circuit for generating a coincidence signal having a frequency of the common measure frequency of said different repetition frequencies of said two pulse coded synchronizing signals when said pulse coded synchronizing signals having said identical pulse coded mode are supplied, a coincidence confirming circuit for producing a confirming signal having a level exceeding a predetermined level when said coincidence signal is supplied within a predetermined time interval, a first signal generator for generating a first signal having a frequency of one of said repetition frequencies of said two pulse coded synchronizing signals, a means for controlling a phase of the first signal generated from said first signal generator by said coincidence signal, a second signal generator for generating a second signal having a frequency of the other one of said two repetition frequencies of said two pulse coded synchronizing signals, a means for controlling a phase of said second signal generated from said second signal generator by said coincidence signal, a third signal generator for generating a third signal having a frequency of a common measure or common multiple frequency of the two repetition frequencies of said first signal and of said second signal, and a means for controlling said gate circuit by supplying said confirming signal and the third signal to said gate circuit and to operate the gate circuit by the third signal only when the confirming signal has a level exceeding a predetermined level and to control said gate circuit to pass said composite signal in the other instances.

6. A receiver as claimed in claim 5, wherein the third signal generator comprises an AND gate which produces the third signal at its output when the first and second signals are supplied to its input terminals.

7. A receiver as claimed in claim 5, wherein the receiver further comprises an automatic gain control device having, means for obtaining a third signal having a common measure frequency of the two repetition frequencies from said first and second signals, a gate circuit, a means for detecting the signal level of a blanking period of a synchronizing signal by controlling said gate circuit by the third signal, and a means for controlling gain of the receiver by the detected signal.

8. A receiver as claimed in claim 5, wherein the coincidence circuit comprises:

a mode generator for producing output pulses having a fixed pulse coded mode which is the same as said identical pulse coded mode, a shift register for transferring each bit of said composite signal supplied to its input terminal and providing output pulses, a comparator, first means for producing pulses by comparing each bit of the output pulses of said shift register and each bit of the output pulses of said mode generator in said comparator when said bit of the pulse coded mode of said composite signal is equal to a corresponding bit of said pulse coded mode of said output signals of said mode generator, a memory for storing pulses from said first producing means, and second means for producing a coincidence signal at an output of said memory, by storing said pulses in said memory, when a predetermined number of said pulses are memorized in said memory.

9. A receiver as claimed in claim 5, wherein the receiver further comprises a clamp circuit having, a means for obtaining a third signal having a frequency of a common measure frequency of said two repetition frequencies of said first and second signals by using said first and second signals, and a means for fixing the level of the blanking period of said composite signal at a predetermined voltage by using said third signal.

10. A receiver for receiving a composite signal including a video signal and an audio multiplex signal transmitted alternately in a predetermined sequence, the video signal and the audio multiplex signal including respective blanking period and respective pulse coded synchronizing signals having different repetition frequencies in the video signal transmission period and in the audio multiplex signal transmission period wherein parts of the two pulse coded synchronizing signals inserted in said video signal and said audio multiplex signal have an identical pulse coded mode at a common measure frequency of the two repetition frequencies of said pulse coded synchronizing signals, wherein the receiver comprises:

a synchronizing signal regererator having, a. a coincidence circuit for generating a coincidence signal having a frequency of the common measure frequency of said different repetition frequencies of said two pulse coded synchronizing signals when said pulse coded synchronizing signals having said identical pulse coded mode are supplied, b. a means for producing first and second signals having two repetition frequencies, respectively, and having a controlled phase by said coincidence signal, an automatic gain control device including, a. a means for obtaining a third signal having a common measure frequency of said two repetition frequencies of said first and second signals from said first and second signals, b. a gate circuit, c. a means for detecting the level of said composite signal in a blanking period by controlling said gate circuit by the third signal and for producing a detected signal, and d. a means for controlling gain of the receiver by said detected signal.

11. A receiver for receiving a composite signal including a video signal and an audio multiplex signal transmitted alternately in a predetermined sequence, the video signal and the audio multiplex signal including respective blanking periods and respective pulse coded synchronizing signals having different repetition frequencies in the video signal transmission period and in the audio multiplex signal transmission period wherein parts of the two pulse coded synchronizing signals inserted in said video signal and said audio multiplex signal have an identical pulse coded mode at a common measure frequency of the two repetition frequencies of said pulse coded synchronizing signals, wherein the receiver comprises:

a synchronizing signal regenerator including, a. a coincidence circuit for generating a coincidence signal having a frequency of the common measure frequency of said different repetition frequencies of said two pulse coded synchronizing signals when said pulse coded synchronizing signals having said identical pulse coded mode are supplied, b. a means for producing first and second signals having frequencies which are the same as the two repetition frequencies of said pulse coded synchronizing signals, respectively, and having phases synchronized with said coincidence signal, a clamp circuit having, a. a means for obtaining a third signal having a common measure frequency of said two repetition frequencies of said first and second signals from said first and second signals, and b. a means for fixing the level of a blanking period of said composite signal at a predetermined voltage by said third signal.

12. A receiver for receiving a composite signal including a video signal and an audio multiplex signal transmitted alternately in a predetermined sequence, the video signal and the audio multiplex signal including respective blanking periods and respective pulse coded synchronizing signals having different repetition frequencies in the video signal transmission period and in the audio multiplex signal transmission period wherein parts of the two pulse coded synchronizing signals inserted in said video signal and said audio multiplex signal have an identical pulse coded mode at a common measure frequency of the two repetition frequencies of said pulse coded synchronizing signals, wherein the receiver comprises:

a coincidence circuit for generating a coincidence signal having a frequency of the common measure frequency of said different repetition frequencies of said two pulse coded synchronizing signals when said pulse coded synchronizing signals having said identical pulse coded mode are supplied, a means for producing first and second signals having frequencies which are the same as said two repetition frequencies of said pulse coded synchronizing signals and having phases synchronized with said coincidence signal, a means for producing a third signal having a frequency of a common measure frequency of said two repetition frequencies of said first and second signals from first and second signals, a gate circuit, a means for detecting the signal level of a blanking period by controlling the gate by said third signal and for producing a detected signal, a means for controlling gain of the receiver by the detected signal, and a means for fixing the level of said blanking period of said composite signal at a predetermined voltage.

13. A receiver for a composite signal including a video signal and an audio multiplex signal transmitted alternately in a predetermined sequence, the video signal and the audio multiplex signal including respective pulse coded synchronizing signals having different repetition frequencies in the video signal transmission period and in the audio multiplex signal transmission period wherein parts of the two pulse coded synchronizing signals inserted in said video signal and said audio multiplex signal have an identical pulse coded mode at a common measure frequency of the two repetition frequencies of said pulse coded synchronizing signals, wherein the receiver comprises:

a gate circuit, a coincidence circuit for generating a coincidence signal having a frequency of the common measure frequency of said different repetition frequencies of said two pulse coded synchronizing signals when said pulse coded synchronizing signals having said identical pulse coded mode are supplied, a basic oscillator, a first frequency converter for producing a first signal having a frequency corresponding to one of said two repetition frequencies of said pulse coded synchronizing signals at an output terminal when the output signal of the basic oscillator is supplied to its input terminal, a second frequency converter for producing a second signal having a frequency corresponding to the other one of said two repetition frequencies of said pulse coded synchronizing signals at an output terminal when the output signal of the basic oscillator is supplied to its input terminal, a means for synchronizing phases of the first and second signals with the phase of said coincidence signal in said first and second frequency converters, an AND gate, a means for obtaining a third signal at an output terminal of the AND gate by supplying the first and second signals to input terminals of the AND gate, and a means for gating said synchronizing signals from the composite signal by supplying the third signal to the gate circuit.

14. A receiver as claimed in claim 13, wherein the receiver further comprises a means for controlling the oscillating frequency of the basic oscillator and phase thereof by using a part of a synchronizing signal.

15. A receiver as claimed in claim 13, wherein the coincidence circuit comprises:

a mode generator for producing output pulses having a fixed pulse coded mode which is the same as said identical pulse coded mode, a shift register for transferring each bit of said composite signal supplied to its input terminal and providing output pulses, a comparator, first means for producing pulses by comparing each bit of the output pulses of said shift register and each bit of the output pulses of said mode generator in said comparator when said bit of the pulse coded mode of said composite signal is equal to a corresponding bit of said pulse coded mode of said output signals of said mode generator, a memory for storing pulses from said first producing means, and second means for producing a coincidence signal at an output of said memory, by storing said pulses in said memory, when a predetermined number of said pulses are memorized in said memory.

16. A receiver for receiving a composite signal including a video signal and an audio multiplex signal transmitted alternately in a predetermined sequence, the video signal and the audio multiplex signal including respective pulse coded synchronizing signals having different repetition frequencies in the video signal transmission period and in the audio multiplex signal transmission period wherein parts of the two pulse coded synchronizing signals inserted in said video signal and said audio multiplex signal have an identical pulse coded mode at a common measure frequency of the two repetition frequencies of said pulse coded synchronizing signals, wherein the receiver comprises:

a gate circuit, a coincidence circuit having first and second output terminals for producing a first coincidence signal at the first terminal having a frequency of the common measure frequency of said different repetition frequencies of said two pulse coded synchronizing signals when said pulses having said identical pulse coded mode are supplied, and for producing a second coincidence signal at the second terminal having a first frequency which is the same as the frequency of said pulse coded synchronizing signal in said video signal period when said pulse coded synchronizing signal inserted in said video signal is supplied and having a second frequency which is the same as the frequency of said pulse coded synchronizing signal in said audio multiplex signal period when said pulse coded synchronizing signal inserted in said audio multiplex signal is supplied, a basic oscillator, a first frequency converter for producing a first signal having a frequency of one of said two repetition frequencies at an output terminal when an output signal of the basic oscillator is applied to its input terminal, a second frequency converter for producing a second signal having a frequency of the other one of said two repetition frequencies at an output terminal when an output signal of the basic oscillator is applied to its input terminal, a third frequency converter for producing a third signal having a frequency corresponding to a common measure frequency of said two repetition frequencies at an output terminal when an output signal of the basic oscillator is supplied to its input terminal, a means for controlling phases of the first and second signals by supplying the first coincidence signal to the first and second frequency converters, a means for controlling the phase of the third signal by supplying the second coincidence signal to the third frequency converter, and a means for gating a synchronizing signal from the composite signal by supplying the third signal to said gate circuit.

17. A receiver for receiving a composite signal including a video signal and an audio multiplex signal transmitted alternately in a predetermined sequence, the video signal and the audio multiplex signal including respective pulse coded synchronizing signals having different repetition frequencies in the video signal transmission period and the audio multiplex signal transmission period wherein parts of the two pulse coded synchronizing signals inserted in said video signal and said audio multiplex signal have an identical pulse coded mode at a common measure frequency of the two repetition frequencies of said pulse coded synchronizing signals, wherein the receiver comprises:

a gate circuit, a coincidence circuit for generating a coincidence signal having a frequency of the common measure frequency of said different repetition frequencies of said two pulse coded synchronizing signals when said pulse coded synchronizing signals having identical pulse coded mode are supplied, a first oscillator for producing a first signal having a frequency of one of said two repetition frequencies, a second oscillator for producing a second signal having a frequency of the other one of said two repetition frequencies, a means for controlling phases of said first and second signals by supplying said coincidence signal to the first and second oscillators, an AND gate, a means for obtaining a third signal at the output of the AND gate by supplying the first and second signals to input terminals of the AND gate, and a means for gating a synchronizing signal from the composite signal by supplying said third signal to the gate circuit.

* * * * *